US009229170B1

United States Patent
Wang et al.

(10) Patent No.: US 9,229,170 B1
(45) Date of Patent: Jan. 5, 2016

(54) TWO-PORT OPTICAL DEVICES USING MINI-COLLIMATORS

(75) Inventors: Xuan Wang, San Jose, CA (US); Shiping Zhang, Guangdong (CN); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 372 days.

(21) Appl. No.: 13/425,311

(22) Filed: Mar. 20, 2012

(51) Int. Cl.
*G02B 6/32* (2006.01)
*G02B 6/255* (2006.01)

(52) U.S. Cl.
CPC *G02B 6/32* (2013.01); *G02B 6/255* (2013.01); *G02B 6/327* (2013.01)

(58) Field of Classification Search
None
See application file for complete search history.

(56) References Cited

U.S. PATENT DOCUMENTS

| | | | | |
|---|---|---|---|---|
| 4,701,011 A | * | 10/1987 | Emkey et al. | 385/34 |
| 6,454,465 B1 | * | 9/2002 | Uschitsky et al. | 385/79 |
| 6,961,496 B2 | * | 11/2005 | Hellman et al. | 385/47 |
| 7,343,068 B2 | * | 3/2008 | Shigenaga et al. | 385/33 |
| 7,352,937 B2 | * | 4/2008 | Zhong et al. | 385/101 |
| 7,542,638 B2 | * | 6/2009 | Blauvelt et al. | 385/34 |
| 8,036,506 B2 | * | 10/2011 | Pan | 385/39 |

* cited by examiner

*Primary Examiner* — John M Bedtelyon
(74) *Attorney, Agent, or Firm* — Joe Zheng

(57) ABSTRACT

Designs of 2-port optical devices are disclosed. The optical devices so designed are amenable to small footprint, enhanced impact performance, lower cost, and easier manufacturing process. The optical device comprises at least two collimators, each of the collimators including: a single-mode fiber, and a multi-mode graded index fiber, aligned with the single-mode fiber in a way that the multi-mode graded index fiber and the single-mode fiber are spliced together, wherein the multi-mode graded index fiber is designed to have a predefined length.

13 Claims, 8 Drawing Sheets

TWO-PORT OPTICAL DEVICES USING MINI-COLLIMATORS

CROSS-REFERENCE TO RELATED APPLICATION

This application is related to the provisional application, No. 61/519,577, entitled "Mini-collimator for 2-port optical devices", filed on May 26, 2011, which is hereby incorporated by reference for all purposes.

BACKGROUND OF THE INVENTION

1. Field of the Invention

The invention is generally related to the area of optical communications. In particular, the invention is related to optical devices, modules or assemblies as pluggable devices processing light beams and the making thereof. The optical devices modules or assemblies include, but may not be limited to, 2-port pluggable fiber based WDM filters, pluggable optical fiber isolator, and miniature optical collimators.

2. The Background of Related Art

Optical fiber is an ideal waveguide than can transmit light between two ends thereof with very low loss to the light. However, a lot of optical functions available in free-space optics could be impractical or more expensive to be realized in the fiber media. For example, fiber collimators are widely used in fiber optic devices to couple light between fiber and free-space. As the characteristics of the light propagating in the fiber and in the free-space are usually very different, the interface between them are usually very lossy which makes a lot of applications impractical. With a collimator, one can achieve light coupling at low loss and a relatively long working distance in free-space to insert one or more free-space components in order to realize optical functions with complexity such as optical WDM, optical isolator, optical attenuator, and etc.

Currently, two types of collimators are widely used in telecom applications: C-lens collimators 100 and GRIN lens collimators 102 as demonstrated in FIG. 1 (a) and FIG. 1(b). Both approaches place a fiber facet at or around the focal point of a lens so that a light at the other side of the lens is collimated into paralleled beam to achieve a long working distance. Usually, a small angle (8°) is introduced at the interface between the fiber and the lens in order to manage the return loss to an acceptable level (usually 50-60 dB). As the C-lens and GRIN lens are both fabricated by bulk optical fabrication techniques, such as cutting, polishing and etc., it is difficult to achieve compact sizes (e.g., <1 mm). As the optical devices nowadays go smaller and smaller, which causes more and more complexities within the same dimension restrictions, these types of optical collimators of FIGS. 1 (a) and (b) limit the size of the optical devices.

Accordingly, there is a great need for such optical modules being made small, and at the same time, the collimators so designed are amenable to small footprint, broad operating wavelength range, enhanced impact performance, lower cost, and easier manufacturing process. Moreover, an emerging need for telecommunication devices calls for pluggable devices. Such needs have been witnessed by the active devices such as fiber optical transceivers and transponders that take a variety of form factors such as SFP, XFP, QSFP, CFP, etc. As the growth matures in active optical devices, passive optical devices such as optical WDM filters, multiplexers, attenuators, switches, isolators, will also need to match up to be pluggable in order to help more demand in planning and deployment flexibility. To facilitate such a pluggability need, fiber collimator dimension often is the limiting factor in order to shrink a fully functional passive device of interest to the necessary dimension.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for pluggable optical passive devices that need to use fiber collimators. As for key building blocks of such pluggable fiber optic passive devices, a compact fiber optic collimator is disclosed. According to one aspect of the present invention, two pieces of dissimilar fibers, a single mode fiber and a multi-mode graded index fiber, are aligned and spliced together. As the multi-mode graded index fiber (MM-GIF) works very similar to the GRIN lens, it can collimate a light beam with a properly designed multi-mode (MM) fiber length. In one embodiment, the length for optimal collimation is designed to be substantially close to $(2n-1)*0.25*P$, where n is an integer and P is the pitch of the MM-GIF which is determined by the fiber index distribution.

The optical collimators so designed in accordance with the present invention are amenable to small footprint, enhanced impact performance, lower cost, and easier manufacturing process. Various embodiments of the present invention may be used in many areas such as optical communications and devices and may be implemented in many ways as a sub-system, a device or a method. According to one embodiment, the present invention is an optical device having two ports, the optical device comprises at least two collimators, each of the collimators including: a single-mode fiber, and a multi-mode graded index fiber, aligned with the single-mode fiber in a way that the multi-mode graded index fiber and the single-mode fiber are spliced together, wherein the multi-mode graded index fiber is designed to have a predefined length.

In one embodiment, the predefined length of the multi-mode graded index fiber is defined to be substantially close to $(2n-1)*0.25*P$, where n is an integer and P is a pitch of one end of the multi-mode graded index fiber. In one embodiment, the length of such a proposed ultra-compact 2-port device may be as short as 20 mm including the ferrules. Compared to the equivalents with the prior art technology, it has great advantage in sizes in addition to similar optical performance, thermal stability and even lower cost compared to that for the prior art 2-port devices. Due to the size being compact, such a collimator can be inserted into standard ceramic ferrules with hollow structure in one embodiment.

When such a pair of mini-collimators are integrated in a 2-port device, a fiber optic pluggable device can be formed with different types of free-space components. An example of the free-space components includes, but may not be limited to, a thin-film filter (high-pass, low-pass, band-pass, etc.) and an isolator. Also, multiple components may be inserted in series between two such collimators for applications with higher complexity or to achieve better optical performance. Due to the fabrication tolerance of the mini-collimator, a light beam comes out from or into the collimator may have a small angle)(<2° with respect to the axis thereof and it may be off-center (<0.1 mm). In one embodiment, the holder may be designed to allow small angular or/and translational offset of the two collimators during an alignment process in order to compensate for the fabrication errors. After alignment, the two ferrules can be fixed to the holder with epoxy or other methods. After the assembly, the other side of the ferrules can be polished to PC, APC, UPC or other surface type, so that it is ready to mate with other ferrules.

Different types of free-space components may be used in the 2-port device. An example of the free-space components includes, but may not be limited to, a thin-film filter (high-pass, low-pass, band-pass, etc.), an isolator. Also, multiple components may be inserted in series between the collimators for applications with higher complexity or to achieve better optical performance. Due to the fabrication tolerance of the mini-collimator, a light beam comes out from or into the collimator may have a small angle)(<2° with respect to the axis thereof and it may be off-center (<0.1 mm). In one embodiment, the holder should be designed to allow small angular or/and translational offset of the two collimators during an alignment process in order to compensate for the fabrication errors. After alignment, the two ferrules will be fixed to the holder with epoxy or other methods. After the assembly, the other side of the ferrules can be polished to PC, APC, UPC or other surface type, so that it is ready to mate with other ferrules.

Many objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
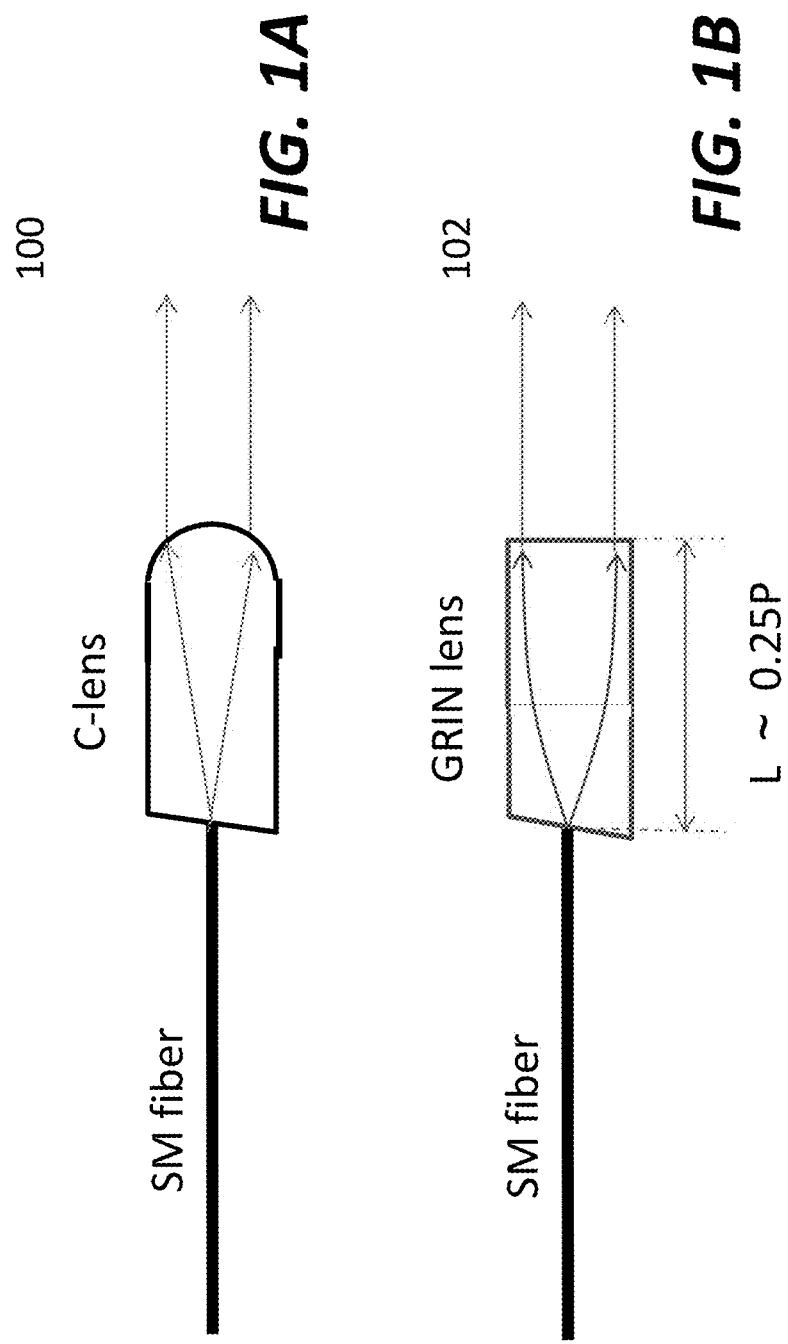
FIG. 1A and FIG. 1B shows an exemplary C-lens collimator and an exemplary GRIN lens collimator, respectively.
Figure 2:
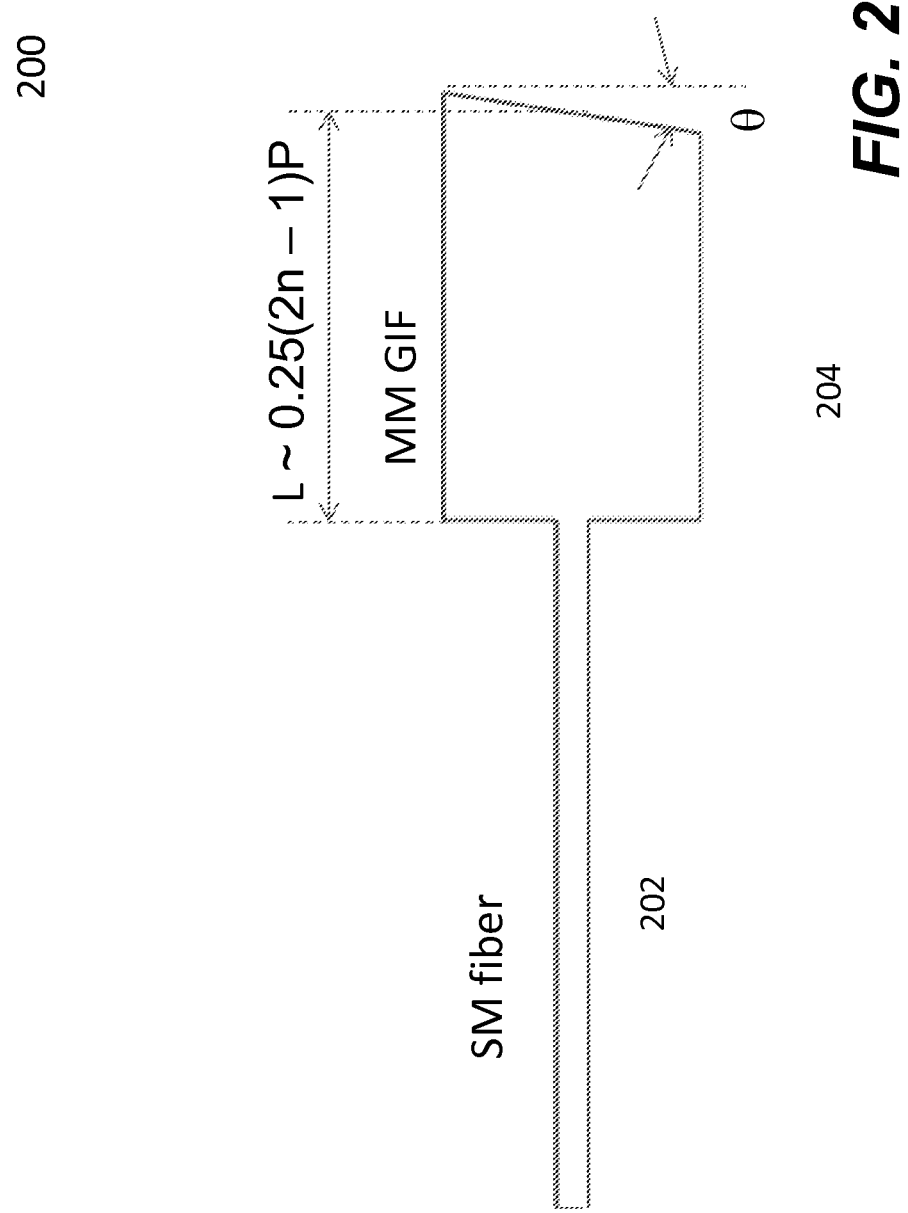
FIG. 2 shows such a collimator according to one embodiment of the present invention.

According to one embodiment of the present invention, a novel optical collimator in compact size and good optical performance is disclosed. FIG. 2 shows such a collimator 200 according to one embodiment of the present invention. As shown in the figure, two pieces of dissimilar fibers, a single mode fiber 202 and a multi-mode graded index fiber 204 are aligned and spliced together. As the multi-mode graded index fiber (MM-GIF) works very similar to the GRIN lens, it can collimate the light beam with a proper designed multi-mode (MM) fiber length. In one embodiment, the length for optimal collimation is designed to be substantially close to $(2n-1)*0.25*P$, where n is an integer and P is the pitch of the MM-GIF which is determined by the fiber index distribution.

The commonly used MM-GIFs are usually with a core size of 50 um or 62.5 um and an outer diameter being 125 um. Due to the small core size (i.e., the lens aperture), the working distances of such a collimator with these MM-GIFs are usually limited to sub-mm which are normally not practical to make optical devices to accommodate other free-space component(s).

According to one embodiment, an MM-GIF with large core and small numerical aperture (NA) is desired to increase the working distance. Calculation indicates that a working distance of 3.9 mm can be achieved using an MM-GIF with core diameter of 200 um and NA of 0.22. The working distance is sufficient for a 2-port device with a few components (such as thin-film filter) inserted between a pair of such mini-collimators.

According to one embodiment, to manufacture this kind of collimator is to splice two different fibers together. The diameters of the two fibers may be different, in which case specialty fiber splicer is needed. The advantages of this fabrication technique include: 1) reflection at the interface between the two different fibers are usually low as they are in physical contact and the refractive indexes of them are substantially close; 2) an MM-GIF can be cleaved into a designed length after being spliced, thus avoiding the difficulty of preparing and handling a fiber segment with very short length (usually <5 mm); 3) good thermal reliability is expected as the two fibers are attached together.

Figure 3:
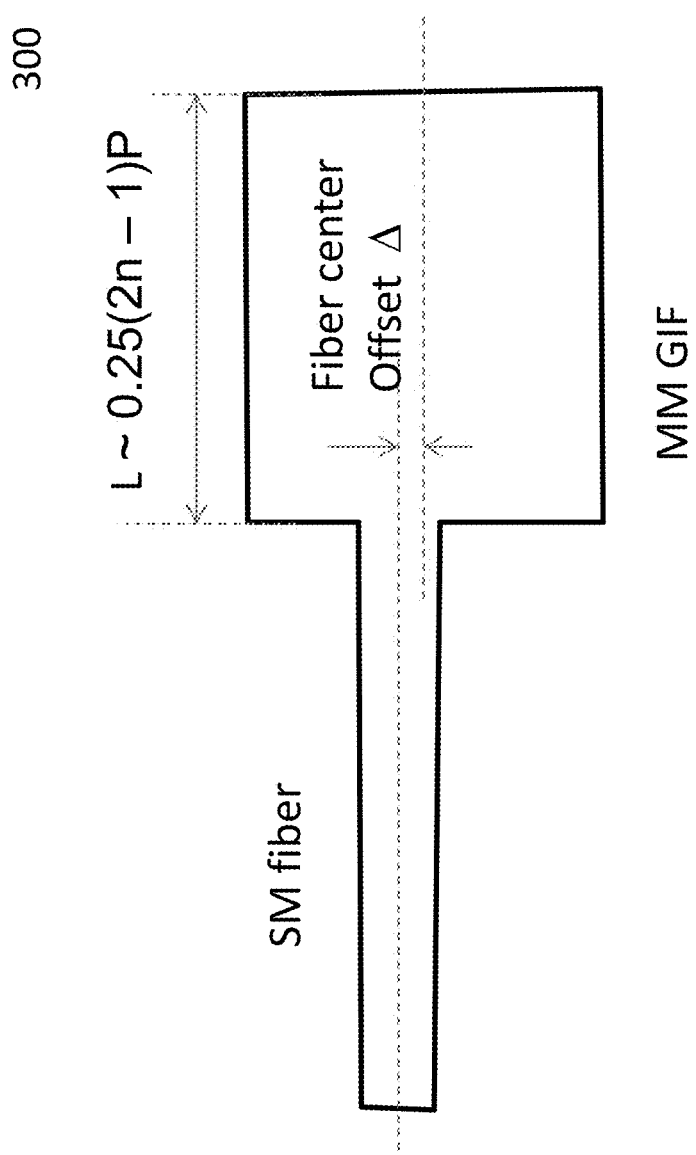
FIG. 3 shows an exemplary collimator with an offset to the axis of the two fibers with straight cut at the end of the MM-GIF.

To manage the return loss, the tip of the MM-GIF can be prepared to an angle by cleaving or polishing. Unlike a typical angle of 8° created to reduce the reflection in a prior art collimator, an angle of 1-2° or less with respect to the axis thereof is sufficient to sustain a high back-reflection or return loss performance. An alternative is to offset the axis of the two fibers with straight cut at the end of the MM-GIF as shown in FIG. 3. Our simulation shows an 8 um axial offset is sufficient to sustain a high back-reflection or return loss performance.

Figure 4:
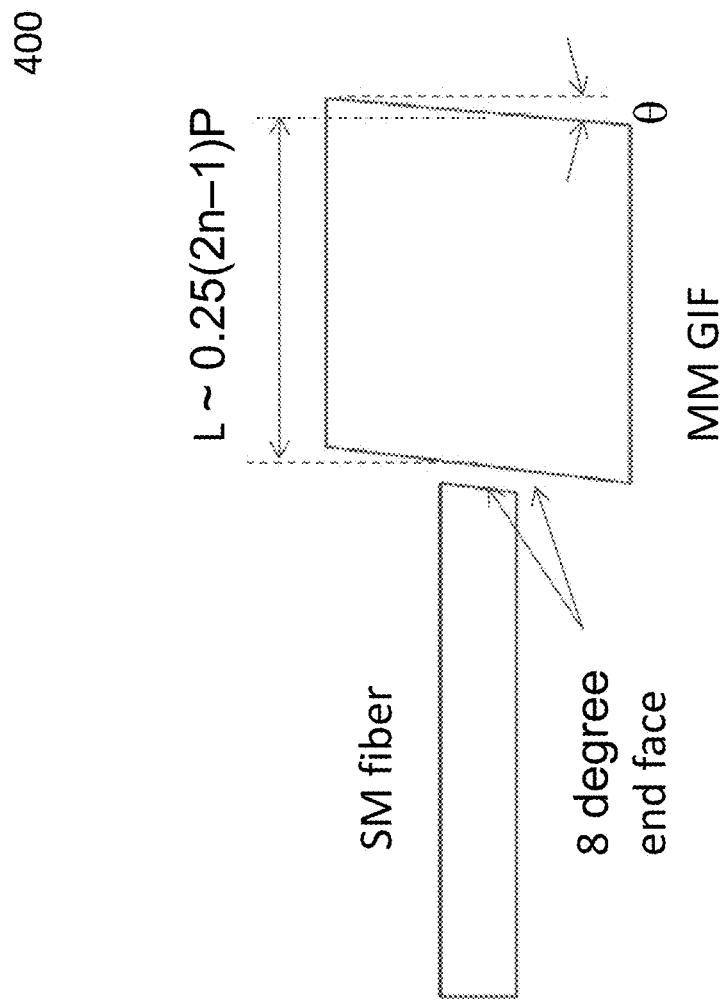
FIG. 4 shows a collimator may be manufactured by aligning two different fibers and bonding them together after alignment by epoxy or other method.

According to another embodiment, other than splicing, a collimator 400 as shown in FIG. 4 may be manufactured by aligning two different fibers and bonding them together after alignment by epoxy or other method. As there is a gap between the two fibers, a high return loss is realized at the interface. In one embodiment, the index matching material of the two fibers or 8° cut angle on bother ends of the fibers are used, which is also illustrated in FIG. 4.

Figure 5:
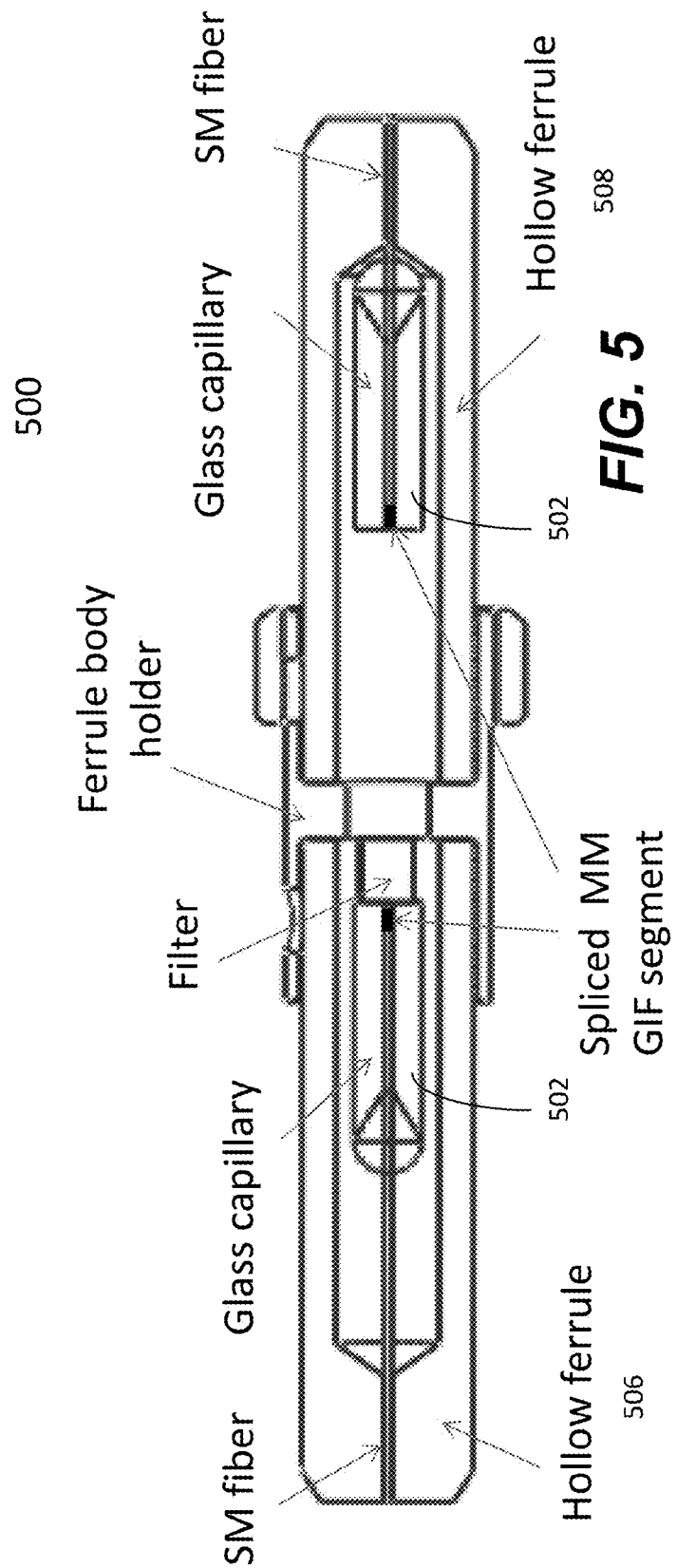
FIG. 5 shows a cross-section view of such a 2-port device employing two mini-collimators, each is preassembled with a ferrule.

FIG. 5 shows a cross-section view of such a 2-port device 500 employing two mini-collimators 502 and 504, each is preassembled with a ferrule 506 or 508. If needed, free-space component(s) may be inserted between the two mini-collimators 502 and 504, and can be attached to either one of the mini-collimators 502 and 504 or to the ferrule thereof or other structure. In one embodiment, the two ferrules 506 and 508 will be fixed on a common holder like the one 510 in FIG. 5 after the two are aligned to achieve the optimal optical performance.

Figure 6:
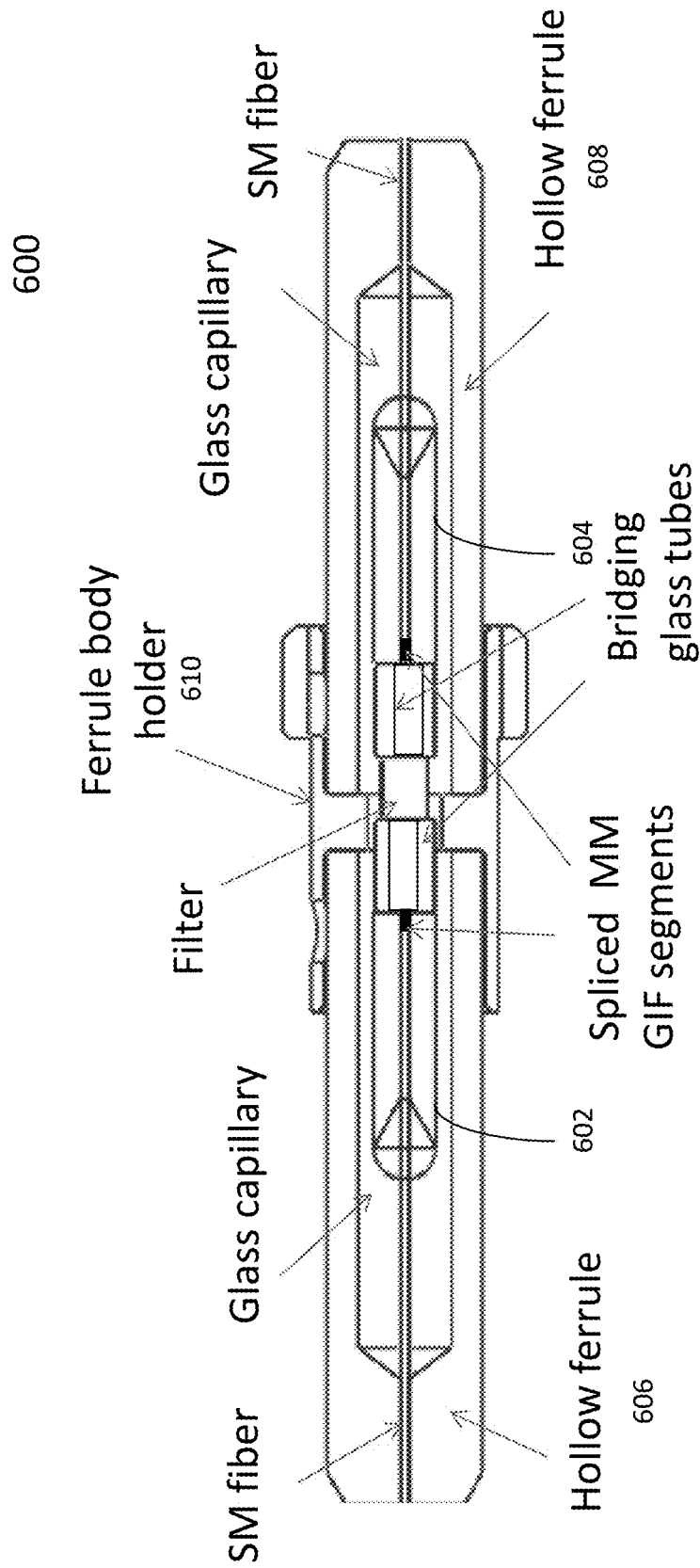
FIG. 6 shows a cross-section view of another 2-port device employing two mini-collimators, each is preassembled with a ferrule.

FIG. 6 shows a cross-section view of another 2-port device 600 employing two mini-collimators 602 and 604, each is preassembled with a ferrule 606 or 608. As shown in FIG. 6, two mini-collimators 602 and 604, and free-space component (s) are attached together after alignment. Sometimes, a spacer is used to ensure good optical coupling between the mini-collimators 602 and 604 by separating them with an optimized working distance. After the mini-collimator pair is assembled, it is inserted to the ferrule pair and attached to the holder 610. In this design, the hole diameter in the ferrules are slightly bigger in order to make room for the assembled mini-collimator pair due to tolerance and materials (such as epoxy) to attach the parts together. Similar to the design shown in FIG. 5, the ferrules can be polished and used to mate with other ferrules as well.

Figure 7:
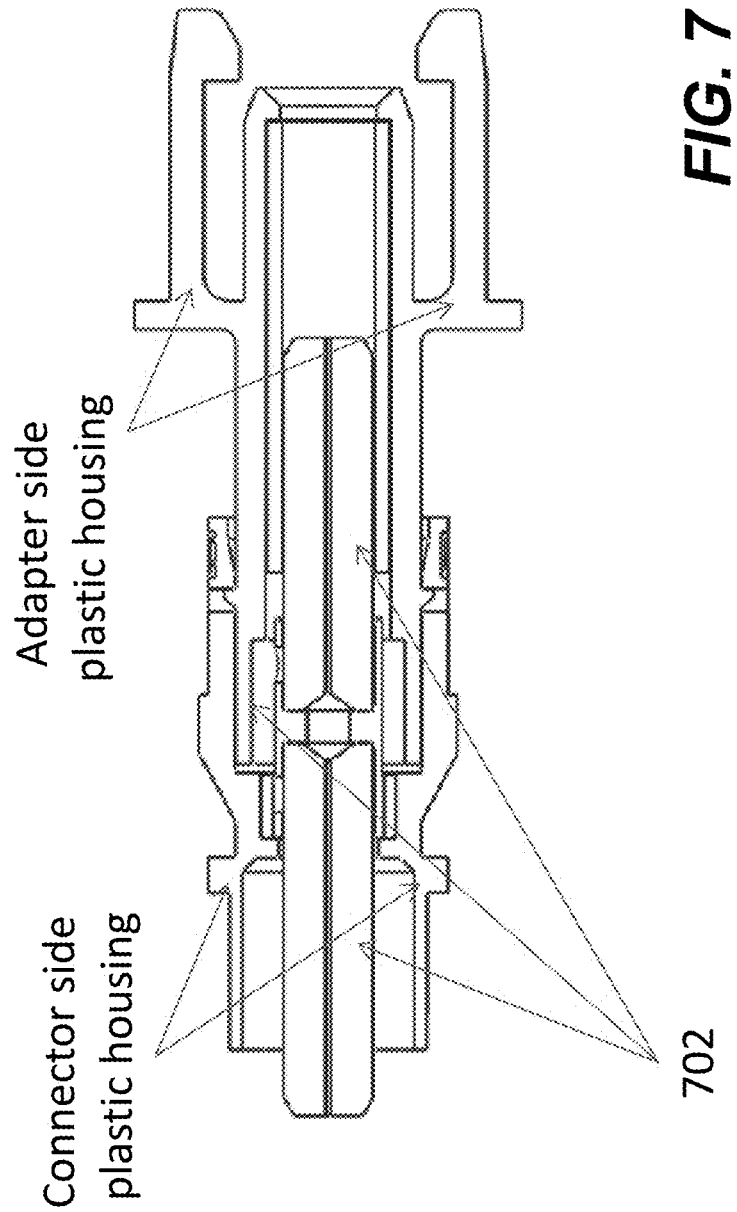
FIG. 7 shows a cross-section view of an exemplary package design according to a predefined form factor.
Figure 8:
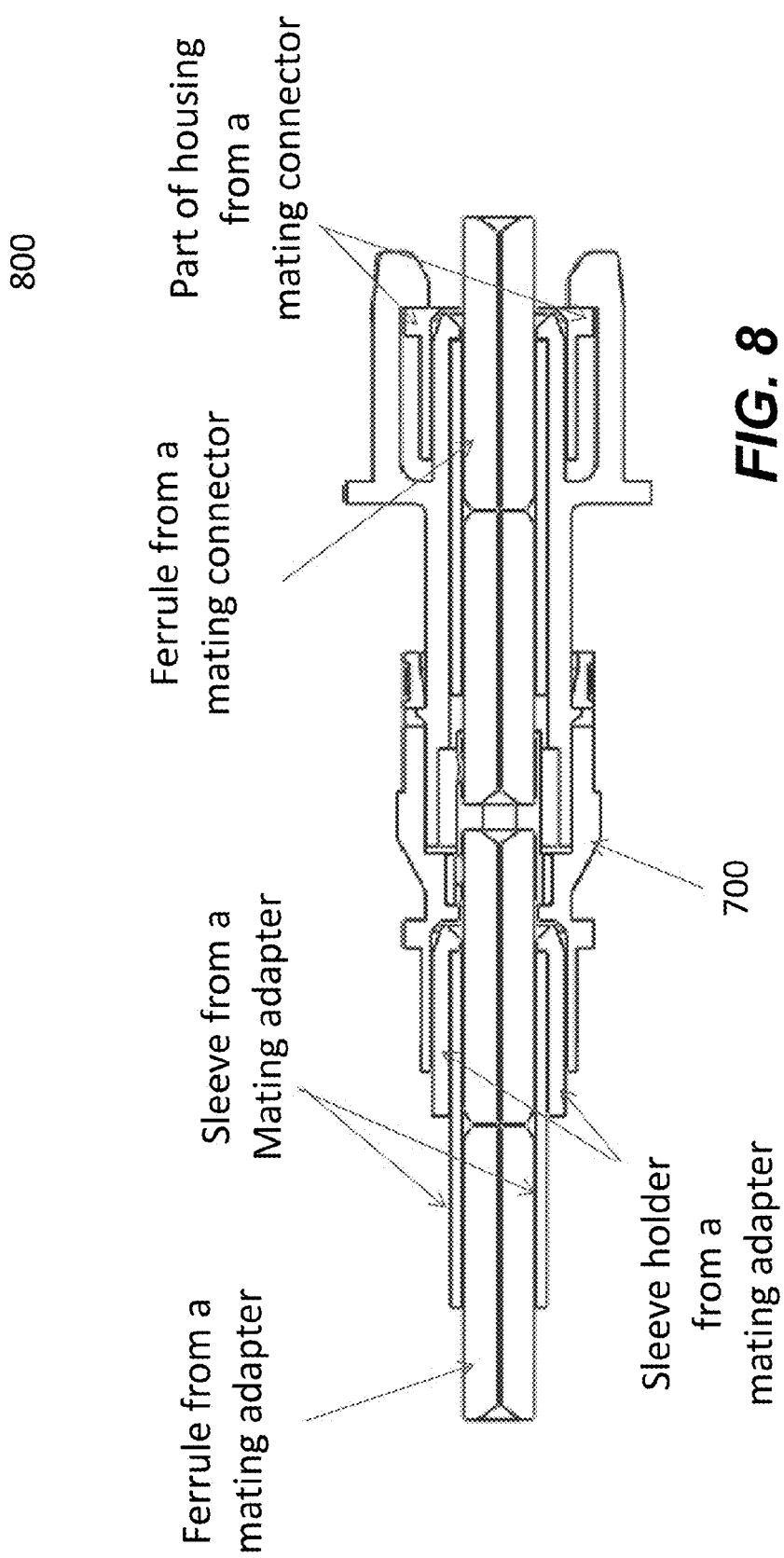
FIG. 8 shows a cross-section view of an exemplary package design according to another predefined form factor.

According to one embodiment, a 2-port device as disclosed in the present invention may be packaged into a device with a predefined form factor similar to a fiber adaptor with designed plastic housing(s). According to one embodiment, FIG. 7 shows a cross-section view of an exemplary package design. Two pieces of plastic housing are designed to make the male-female type adaptors. It may also be packaged with different plastic or metal housings into other types (male-male, female-female) of adaptor form-factors depending on the applications. FIG. 8 shows a cross-section view of an exemplary package design according to another form factor.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical device having a first port and a second port, the optical device comprising:
   a first part used as the first port, a second part used as the second port, each of the first and second parts including:
   a ferrule;
   a glass capillary;
   at least one collimator, the collimators including:
   a single-mode fiber with a first diameter;
   a multi-mode graded index fiber with a second diameter, aligned with the single-mode fiber in a way that the multi-mode graded index fiber and the single-mode fiber are spliced together, wherein the second diameter is physically larger than the first diameter, and the multi-mode graded index fiber is designed to have a predefined length to be less than one pitch of the multi-mode graded index fiber, and the single-mode fiber and the multi-mode graded index fiber are not coaxially aligned but a center of the multi-mode graded index fiber falls onto the single-mode fiber, wherein the multi-mode graded index fiber and the single-mode fiber are coupled together with a fiber splicer and encapsulated in the glass capillary;
   a thin-film filter attached to one end of the multi-mode graded index fiber, wherein the glass capillary and the thin-film filter are coaxially aligned and encapsulated in the ferrule.

2. The optical device as recited in claim 1, further comprising a ferrule body holder provided to integrate the first and second parts coaxially.

3. The optical device as recited in claim 2, wherein the ferrule body holder is a tube and larger than the first part or the second part in diameters, respective portions of the first and second parts are respectively inserted into the tube from two opposite sides of the tube.

4. The optical device as recited in claim 1, wherein one end of multi-mode graded index fiber is prepared to an angle by cleaving or polishing to manage a return loss thereof.

5. The optical device as recited in claim 1, wherein the single-mode fiber is attached to the multi-mode graded index fiber by an offset from an optical axis of the multi-mode graded index fiber, wherein the offset is less than one half of the second diameter.

6. The optical device as recited in claim 1, wherein the collimators in the first and second parts are respectively housed in two ferrules.

7. The optical device as recited in claim 6, further comprising a structure to hold the two ferrules with respective axes aligned.

8. The optical device as recited in claim 6, further comprising one or more free-space components inserted between the two collimators.

9. The optical device as recited in claim 8, wherein the optical device is one of an optical WDM, an optical isolator, an optical attenuator.

10. The optical device as recited in claim 8, wherein the one or more free-space components include a filter attached to either of the two collimators, a structure or a substrate.

11. The optical device as recited in claim 1, wherein each of two ends of the multi-mode graded index fiber has a slanted angle to minimize a return loss.

12. The optical device as recited in claim 1, further comprising two plastic housings, each of the collimators housed in one of the two plastic housings, wherein the two plastic housings are integrated according to a predefined form factor.

13. The optical device as recited in claim 12, wherein the predefined form factor is related to a male-female type adaptor, a male-male type adaptor, or a female-female type adaptor.

* * * * *